United States Patent [19]

Weicht

[11] Patent Number: 5,676,508

[45] Date of Patent: Oct. 14, 1997

[54] MULTI-FUNCTION TIE-DOWN DEVICE

[76] Inventor: Gary Lee Weicht, 110 Gregory Dr., Carrollton, Va. 23314-2518

[21] Appl. No.: 672,557

[22] Filed: Jun. 28, 1996

Related U.S. Application Data

[63] Continuation-in-part of Ser. No. 415,306, Apr. 3, 1995, abandoned.

[51] Int. Cl.⁶ ............................................. B60P 7/08
[52] U.S. Cl. ........................ 410/101; 410/102; 410/106; 114/218
[58] Field of Search ........................... 410/101, 102, 410/106, 108, 110, 104, 107; 114/218; 24/265 D, 115 R; D8/382, 356; 248/499

[56] References Cited

U.S. PATENT DOCUMENTS

| | | | |
|---|---|---|---|
| 864,937 | 9/1907 | Thompson | 114/218 X |
| 3,595,125 | 7/1971 | Jacobs | 410/106 |
| 3,715,782 | 2/1973 | Newell | 114/218 X |
| 3,948,203 | 4/1976 | Matthews | 114/218 |
| 4,200,944 | 5/1980 | Gillespie et al. | 114/218 X |
| 4,295,765 | 10/1981 | Burke | 410/101 |
| 4,316,688 | 2/1982 | Roskelley | 410/102 |
| 4,630,982 | 12/1986 | Fenner | 410/102 |
| 4,812,093 | 3/1989 | Millar, Jr. | 410/110 |
| 4,820,094 | 4/1989 | Hirakui et al. | 410/107 |
| 4,850,770 | 7/1989 | Millar, Jr. | 410/110 |
| 5,011,349 | 4/1991 | McAndrews | 410/102 |
| 5,301,627 | 4/1994 | Czipri | 410/101 X |

FOREIGN PATENT DOCUMENTS

| | | | |
|---|---|---|---|
| 60-131338 | 7/1985 | Japan | 410/107 |

*Primary Examiner*—Karen B. Merritt
*Assistant Examiner*—Stephen Gordon
*Attorney, Agent, or Firm*—Raymond L. Greene Esq.

[57] ABSTRACT

A tie-down device for use with trucks, boats or other vehicles is provided. The tie-down is a single-piece dual-hook device having a pedestal base and an upper attachment section. The base has a threaded hole in the bottom for receiving a bolt or threaded device to a vehicle. The upper attachment section is formed in the general shape of an isosceles having an apex with legs extending downward at an approximate angle of 45° below the horizontal. The outer surface of apex is rounded to avoid snagging. The attachment section has a large bore hole centered under the apex and a pair of hooks in each leg. The tie-down device allows a variety of tie-downs including threading of a line through the bore hole, attaching to the leg hooks, and cleating by winding between hooks, while providing a non-snagging outer form.

4 Claims, 4 Drawing Sheets

MULTI-FUNCTION TIE-DOWN DEVICE

The following application is a continuation-in-part of the Applicant's prior application, having the title Adler Talon, Tie-Down Device, Ser. No. 08/415,306, filed Apr. 3, 1995, now abandoned.

FIELD OF THE INVENTION

The invention is related to cargo tie-down devices and in particular to hooks and tie-downs for pickup trucks or other vehicles.

BACKGROUND OF THE INVENTION

The features and advantages of the invention are numerous. Varieties of tie-down devices for pickup truck cargo restraints are well known in the art. Typically, these devices are eyebolts or hooks secured to the truck sidewalls or secured to the existing stake holes. It is often necessary to secure a load from different directions using different types of lines including free end lines, lines with loops, lines with knotted ends, and lines with attached hooks. Although each of the existing tie downs is well adapted to a particular type of line, no universal tie down is available which is adapted to a variety of lines and which can accept loads in several directions. A need exists for a multi-functional tie-down device which will accept a variety of lines and which can accept loads from several directions. The existing hook devices are well adapted to attached loops and other hooks but are limited in easily accepting free-end lines and further are limited in the direction of loading. The existing eyebolt devices are well adapted to free end lines and to multiple directions of loading but are poorly adapted to attachment of lines with attached loops.

SUMMARY OF THE INVENTION

It is an object of the invention is to channel the flexible binding material to the stronger part of the tie-down device by utilizing the arc of the inside of the appendage on either side of the eye.

It is another intent of the invention to provide an anchoring device which is accessible from substantially all directions for a flexible cargo-binding element, thus minimizing the number of anchoring devices required.

It is a further object of the invention to provide a tie-down device having a means for anchoring from multiple directions.

It is yet another object of the invention to provide a tie-down device having a combination of hook and eye-bolt features.

It is yet another object of the invention to provide a tie-down device having a single-piece body with an external surface adapted to preventing engaging.

It is still another object of the invention to provide a tie-down device adapted for a variety of lines and ties and adapted for quick securing and quick release.

Accordingly, the invention is a single-piece, dual-hook, tie-down device having a pedestal base and an upper attachment section. The base has a threaded hole in the bottom for receiving a bolt or threaded device to a vehicle. The upper attachment section is formed in the general shape of an isosceles having an apex with legs extending downward at an approximate angle of 45° below the horizontal. The outer surface of apex is rounded to avoid snagging. The attachment section has a large bore hole centered under the apex and a pair of hooks in each leg. The tie-down device allows a variety of tie-downs including threading of a line through the bore hole, attaching to the leg hooks, and cleating by winding between hooks, while providing a non-snagging outer form.

BRIEF DESCRIPTION OF THE DRAWINGS

The foregoing objects and other advantages of the present invention will be more fully understood from the following detailed description and reference to the appended drawings wherein.

DETAILED DESCRIPTION OF THE INVENTION

Figure 1:
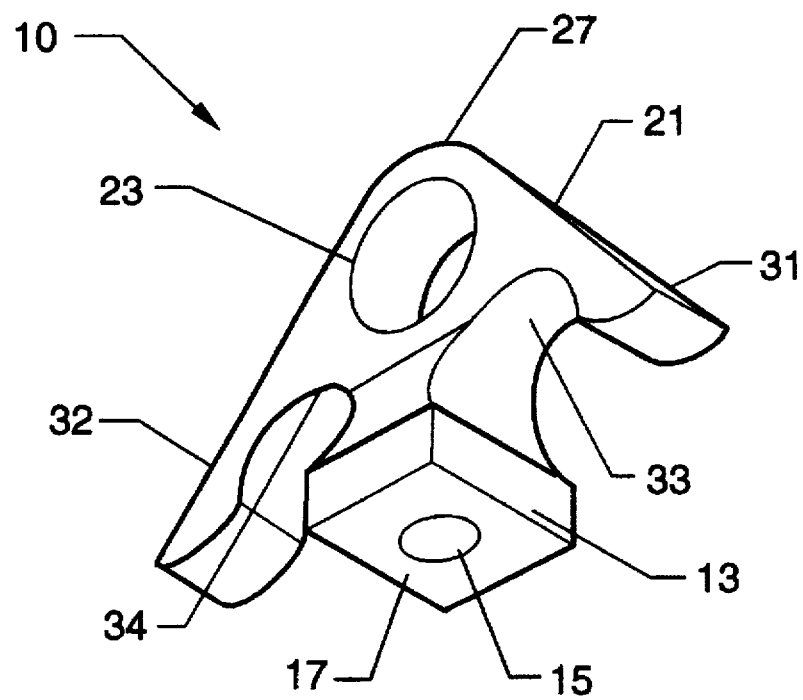
FIG. 1 is a perspective view of the tie-down device.

Referring now to FIG. 1, the tie-down device of the present invention, designated generally by the reference numeral 10 is shown with its major features. The tie-down device has a pedestal base 13 having a threaded hole 15 in its lower surface 17. The threaded hole accepts a bolt, screw or threaded rod to mount the tie-down device 10 on a vehicle such as on the bed sidewalls of a pickup truck. An upper attachment section 21 is formed in the shape of an isosceles triangle having a bore hole 23 located under the apex 27 of the triangle. Two legs 31, 32 extend from the apex 27 sloping downward at approximately forty-five degrees below horizontal. Each leg forms hooks 33 and 34, respectively.

Figure 2:
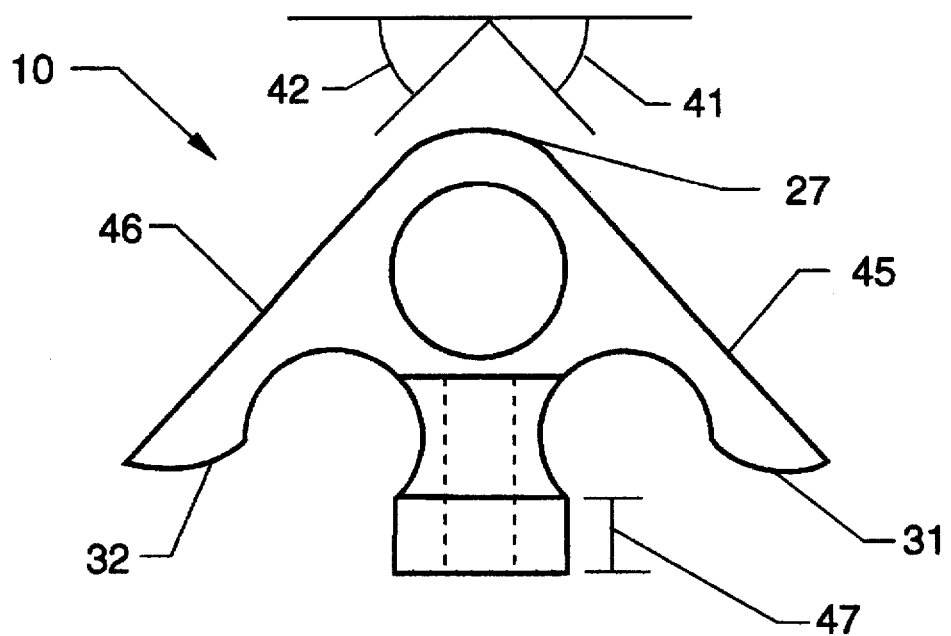
FIG. 2 is a front view of the tie-down device showing the bore hole and hook configuration.

Referring now to FIG. 2, the downward sloping angles 41 and 42 may be seen in the front view. The apex 27 is rounded to provide a snag-free surface which then extends to a straight (plane) surface, 45 and 46, along the top of each leg 31 and 32. The pedestal base 13 is square with sufficient depth 47 to stabilize the tie-down 10 when inserted into a standard stake hole around the bed of a pickup truck.

Figure 3:
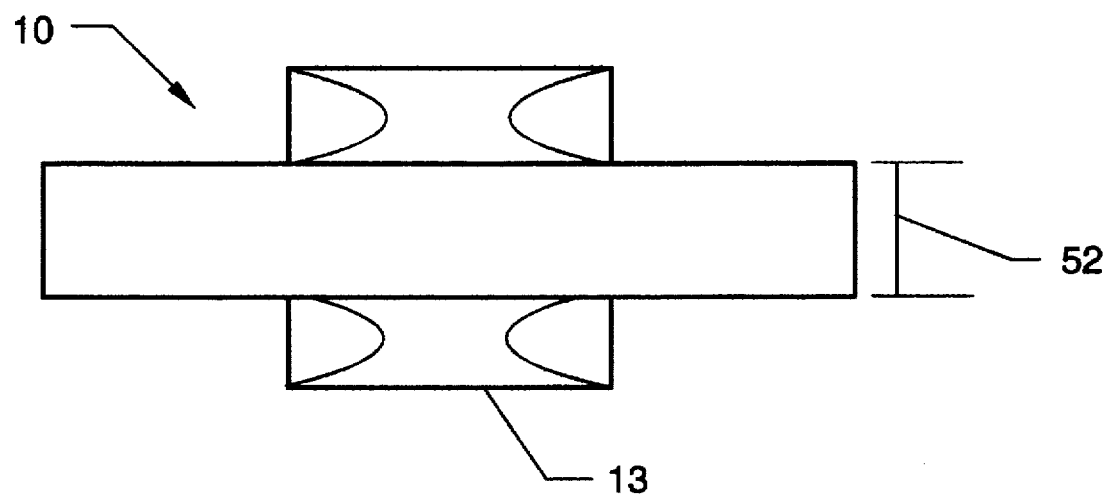
FIG. 3 is a top view of the tie-down device.

The top view of the tie-down, shown in FIG. 3 depicts the thickness 52 of tie-down device 10. In the preferred embodiment, the tie-down device 10 is a single piece unit molded with an integrally-formed base 13. Alternately, the tie-down device 10 may be machined as a single-piece unit.

Figure 4:
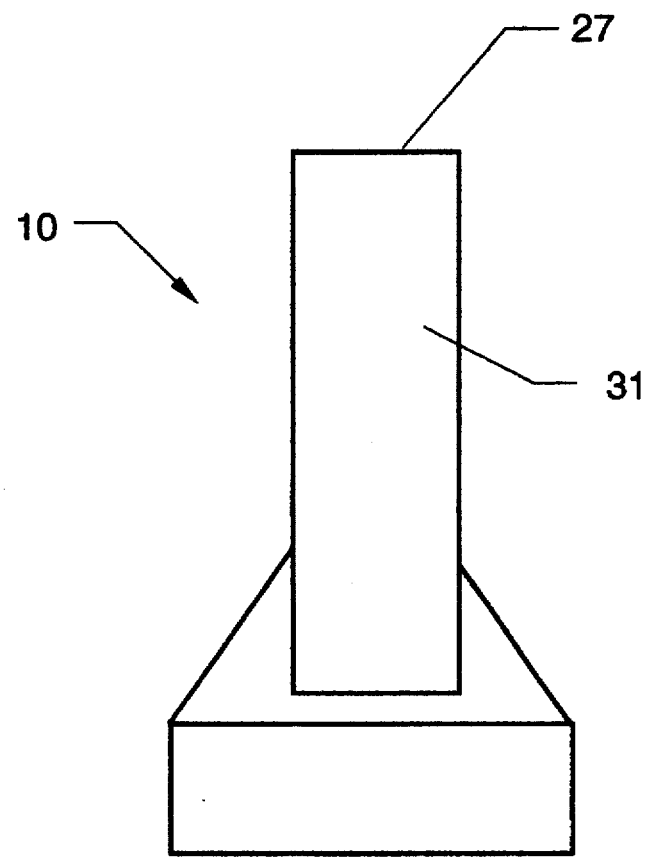
FIG. 4 is a end view showing the angular fairing between the base and upper attachment section.

FIG. 4 shows the end profile of tie-down device 10 wherein smooth snag-free surfaces are present by the legs 31 and rounded apex 27.

Figure 5:
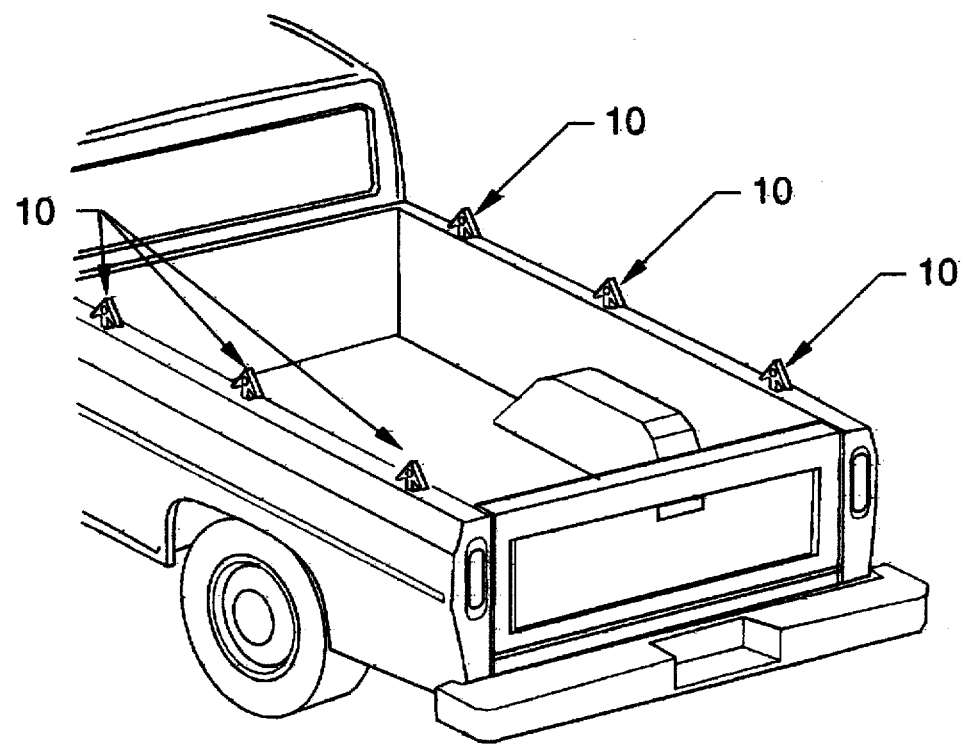
FIG. 5 is a perspective view showing the tie-down device mounted on a pickup truck.

FIG. 5 shows a plurality of tie-down devices 10 in a typical pickup truck installation. Although the tie-down devices 10 are shown installed on a pickup truck, the devices may be attached to a variety of vehicles.

Figure 6:
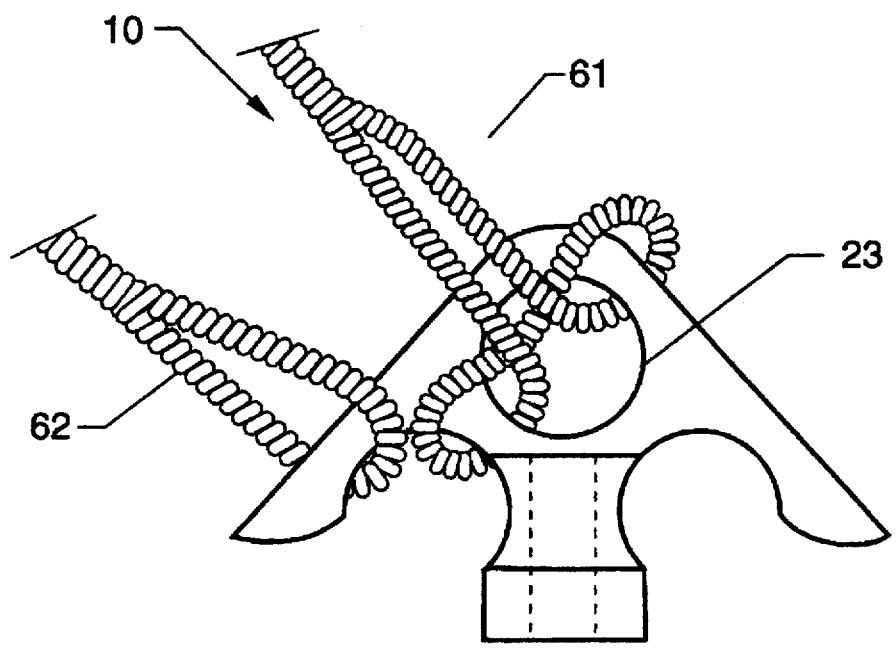
FIG. 6 is a perspective view of the tie-down device showing attachment of lines having loops.

Referring now to FIG. 6, the unique properties of the tie-down device 10 can be seen. Lines with tied or braided loops, such as line 61 and line 62, may be attached in several ways. As depicted by line 61, a loop may be passed through bore hole 23 and looped back over one or more of the hooks, thereby making a highly secure tie. Alternately, a loop may be hooked as shown by line 62 over either of the legs which form hooks on either side of the device.

Figure 7:
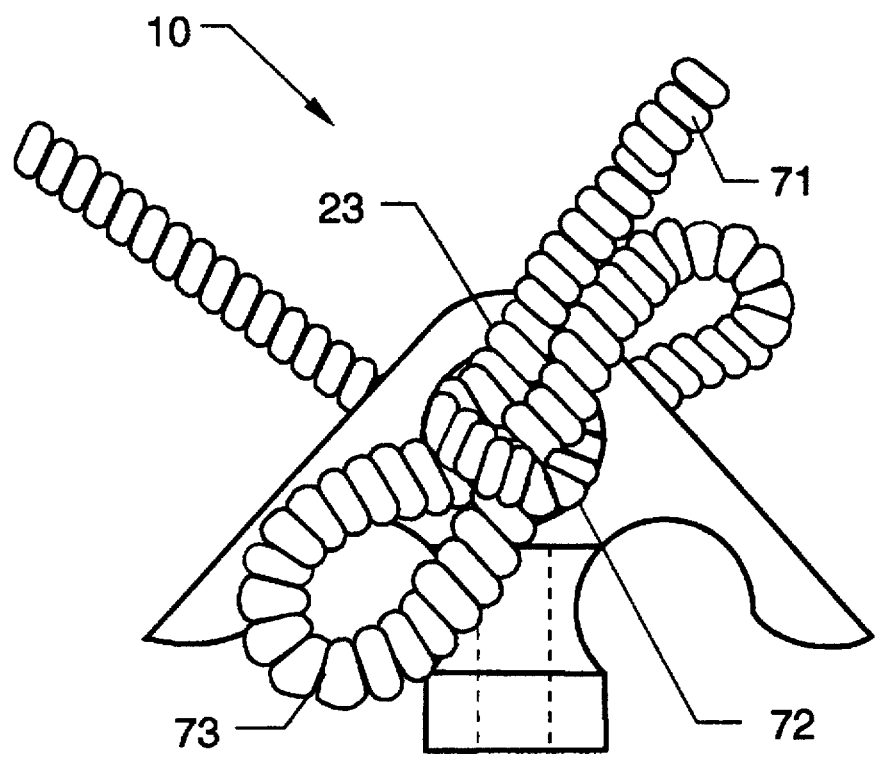
FIG. 7 is a perspective view showing a quick release tie-down.

Referring now to FIG. 7, another tie is shown using a line with a free end 71. In this configuration, the free end 71 is folded to form a first loop 72 which is inserted through bore hole 23 and then a second loop 73 is formed with the remaining length of the free end and wrapped around the tie-down device 10 and inserted through the first loop 72. The effect is a bow-like tie which allows a quick release by pulling the free end.

Figure 8:
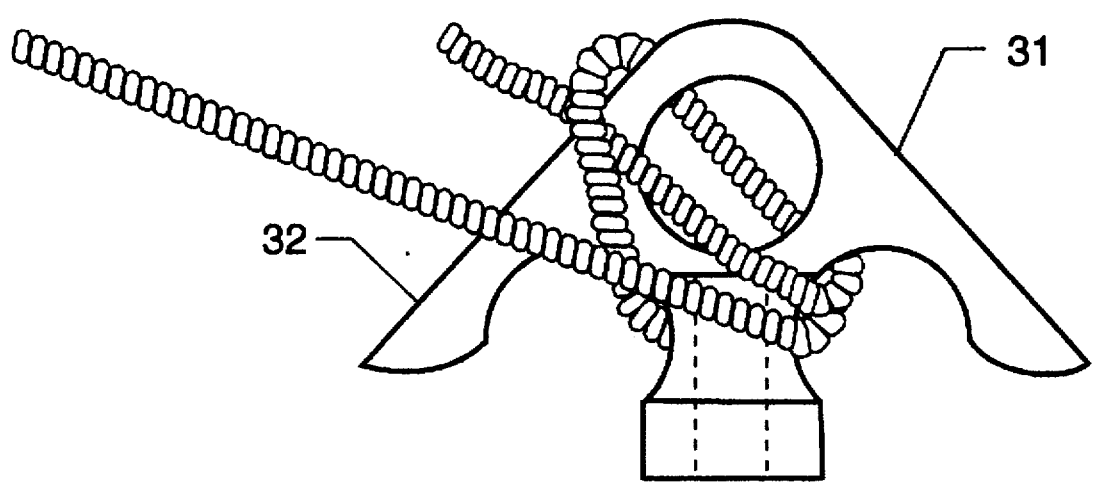
FIG. 8 is a perspective view showing a typical cleat-style tie-down.

In FIG. 8, a cleat-style tie is depicted. In this type of tie, the two legs 31 and 32 are used as cleat legs and accept a variety of cleat-style ties.

The features and advantages of the invention are numerous. It is a decorative device which combines the functions of an eyelet, multiple hooks and a cleat into a single device. As such, the device offers a great variety of anchoring methods and ties. The tie-down device can be used with either metal hooks or flexible lines. The tie-down device allows the load to be quickly secured or unsecured. This innovative new design is also an attractive addition to a pickup truck and is further useful in other commercial, industrial, and recreational applications wherever a load must be quickly secured or unsecured.

Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed as new and desired to be secured by Letters Patent of the United States is:

1. A tie-down device for a vehicle comprising:

an integrally-molded pedestal having a square base adapted to mount in stake holes of a pickup truck bed sidewall; and a multi-function attachment section, substantially shaped as an isosceles triangle, having straight-edged legs and affixed to said integrally-molded pedestal and providing a hole forming an eyelet, said attachment section further forming a cleat and a pair of hooks.

2. A tie-down device for a vehicle as in claim 1 wherein said square base has a threaded hole on its lower surface for receiving a bolt.

3. A tie-down device for a vehicle as in claim 1 wherein said multi-function attachment section comprises a rounded upper vertex.

4. A tie-down device for a vehicle as in claim 1 wherein said straight-edged legs extend at an angle approximately 45° downward from horizontal.

* * * * *